United States Patent
Herve et al.

[11] 3,707,870
[45] Jan. 2, 1973

[54] APPARATUS FOR AUTOMATIC AND CONTINUOUS PLOTTING OF ABSORPTION-DESORPTION ISOTHERMS EMPLOYED FOR DETERMINING THE MICROSTRUCTURE OF POROUS BODIES

[75] Inventors: Michel Herve, Bures sur Yvette; Bernard Rasneur, Chevreuse, both of France

[73] Assignee: Commissariat A L'Energie Atomique, Paris, France

[22] Filed: Feb. 22, 1971

[21] Appl. No.: 117,462

[30] Foreign Application Priority Data

Feb. 26, 1970 France..............................7006933

[52] U.S. Cl. ...................................73/38, 73/432 PS
[51] Int. Cl. ..............................................G01n 15/08
[58] Field of Search ............................73/38, 432 PS

[56] References Cited

UNITED STATES PATENTS 3,059,478  10/1962  Coggeshall et al..................73/38 X
3,073,149  1/1963   Mongan ................................73/38

Primary Examiner—Louis R. Prince
Assistant Examiner—Joseph W. Roskos
Attorney—Cameron, Kerkam & Sutton

[57] ABSTRACT

The apparatus essentially comprises a variable-volume enclosure, a pressure transducer in communication with said enclosure, a vacuum line, at least one pipe for the admission of adsorbable gases or vapors, a pipe for the admission of non-adsorbable gases and a sample-holder. Said pipes and said sample-holder are also in communication with said enclosure but can be cut-off by means of cocks. An analog computer is connected electrically to the transducer and to the enclosure and a cartesian-coordinate plotter is connected to the computer to provide absorption-desorption isotherms. The enclosure, the transducer, the analog computer and the sample-holder are maintained at constant temperature.

7 Claims, 4 Drawing Figures

APPARATUS FOR AUTOMATIC AND CONTINUOUS PLOTTING OF ABSORPTION-DESORPTION ISOTHERMS EMPLOYED FOR DETERMINING THE MICROSTRUCTURE OF POROUS BODIES

This invention relates to an apparatus for carrying out automatic and continuous plotting of adsorption-desorption isothermal curves which are employed for the purpose of determining the microstructure of porous bodies, this result being achieved without any need for calculation and by means of a few simple and rapid adjustments.

The microstructure of porous bodies can be determined by a number of different methods, the most important of which result in a graphic presentation in the form of adsorption-desorption isotherms. The methods last mentioned make use either of a manual or automatic apparatus but the isotherms are obtained point by point and not continuously. Moreover, the recorded information essentially involves calculation in order to plot the points of the isotherm.

This invention relates to an apparatus for plotting adsorption-desorption isotherms which is not subject to the disadvantages of known devices by reason of the fact that plotting is carried out automatically and continuously without entailing any calculation.

More precisely, this invention relates to an apparatus for plotting adsorption-desorption isotherms, said apparatus being essentially characterized in that it comprises a variable-volume enclosure, a pressure transducer in communication with said enclosure, at least three pipes including a vacuum line, at least one pipe for the admission of adsorbable gases or vapors and one pipe for the admission of non-adsorbable gases, a sample-holder containing the sample to which the measurements relate, said pipes and said sample-holder being also in communication with said enclosure but fitted with valves which serve to isolate them from said enclosure, an analog computer which is connected electrically to said transducer and to said enclosure and cartesian-coordinate plotter connected to said computer, constancy of temperature being ensured in the case of the enclosure, the transducer, the analog computer and the sample-holder.

Further properties and advantages of this invention will become apparent from the following description which is given with reference to the accompanying drawings and in which two embodiments of the apparatus according to the invention are given by way of explanation without any limitation being implied.

Figure 1:
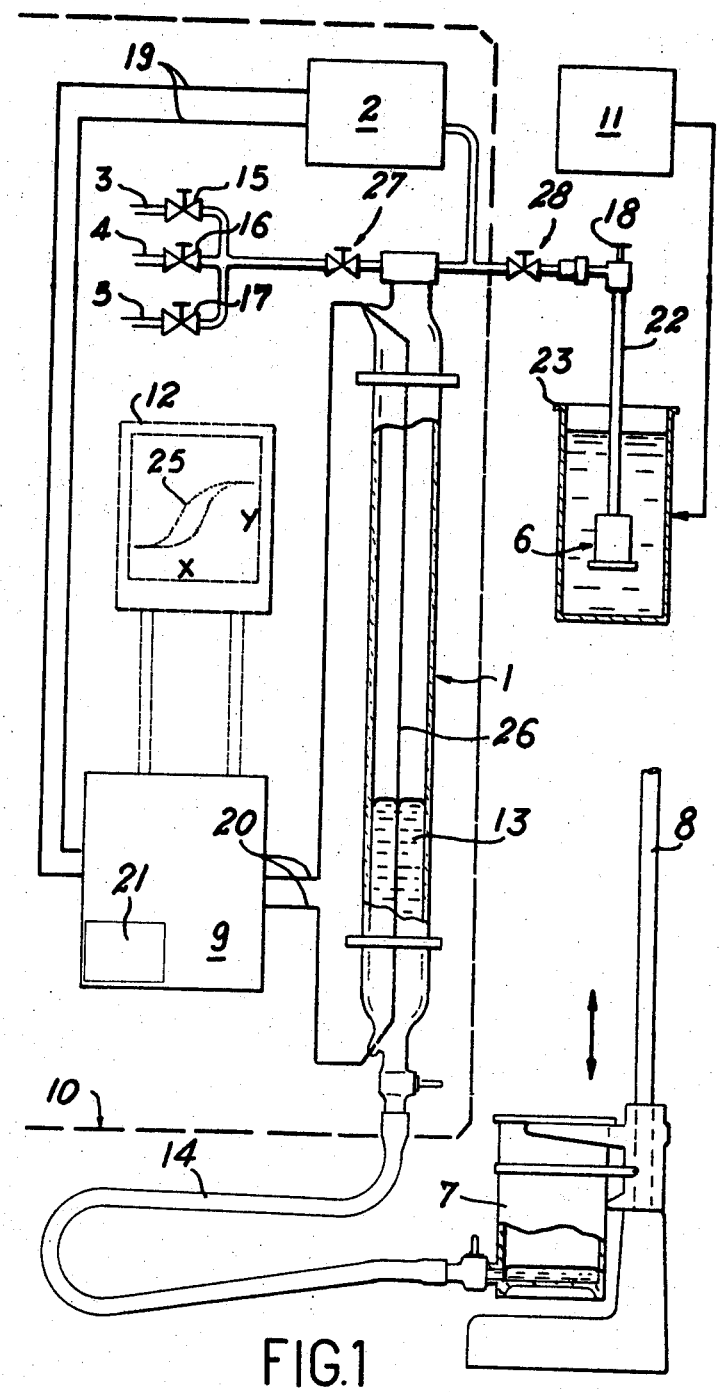
FIGS. 1 and 2 are general arrangement diagrams of the apparatus which correspond respectively to the case of non-programmed measurements and to the case of programmed measurements.

The apparatus according to the invention as illustrated in FIG. 1 is made up of the following elements:

1. A calibrated buret 1 consisting of a vertically-mounted glass tube containing a column 13 of mercury. A communication is established by means of a flexible tube 14 between the lower end of said buret and a reserve supply of mercury contained in a vessel 7 which is slidably mounted on a vertical upright member 8. In order to vary the pressure within the buret 1, the vessel 7 is raised or lowered at variable speeds which are preferably of a very low order.

2. An absolute-pressure transducer 2 which is in communication with the top portion of the buret 1.

3. A pipe 3 for primary and secondary vacua, a pipe 4 for the admission of adsorbable gases or vapors and a pipe 5 for the admission of non-adsorbable gases; each of these three pipes communicates with the top portion of the buret 1 but can be isolated from this latter by closing a cock (15, 16, 17 or 27).

4. A sample-holder or receptacle 6 which communicates by means of a pipe 22 with the upper end of the buret 1 and can be isolated from this latter by closing a cock 18 or 28.

5. An analog computer 9 which is connected electrically to the transducer 2 by means of the conductors 19 and to the buret 1 by means of the conductors 20; the computer case further contains a stabilized direct-current supply 21.

6. An isotherm plotter 12 which is connected to the computer 9.

7. A thermostatically-controlled cage 10 which serves to maintain the buret 1, the transducer 2 and the analog computer 9 at a constant temperature.

8. A container 23 for a constant-level bath, the temperature of the bath being regulated by means of a regulator 11 which serves to maintain the sample-holder 6 at a constant temperature.

The principle of the apparatus according to the invention is as follows:

The apparatus being maintained at constant temperature, the analog computer 9 makes it possible at each instant and as a function of the level of the column of mercury 13 and of the pressure which prevails within the buret 1 to carry out automatic computation of the volume Y of gas or vapor which is adsorbed on the sample contained in the sample-holder 6 as a function of the relative pressure X (which will be defined hereinafter).

On completion of this computation, the analog computer 9 transmits the results to the plotter 12 and this latter plots in a continuous manner an isotherm 25 which is related to axes X and Y.

The relative pressure X represents the quotient $P/P_o$ of the absolute pressure at each instant of the gas or vapor within the buret 1 by the saturated vapor pressure. Said relative pressure can also be written in the form $X = hP$, wherein $h$ is equal to $1/P_o$ ($P_o$ varies only to a small extent during the operation).

As to the adsorbed volume Y, this is expressed by:

$$Y = V \text{ads.} = [V_i - (V_b + V_{em}) \cdot P/760] k,$$

wherein $V_{ads}$ designates the volume adsorbed by the sample contained in the sample-holder 6, $V_i$ designates the volume of adsorbable gas or vapor which is introduced into the buret 1 at the beginning of the operations (the cock 16 being opened in order to introduce the gas whilst the cocks 15, 17 and 28 are closed), $V_b$ and $V_{em}$ designate the volumes of adsorbable gas which are present respectively within the buret 1 and within the dead space of the sample holder 6 (after closure of the cock 27, opening of the cocks 18 and 28 and adsorption of gas by the sample) and $k$ designates a factor which serves to relate by means of a very simple coefficient the unit volume (at normal temperature and pressure) to the corresponding voltage.

The factor $P/760$ by which is multiplied the parenthesis $V_b + V_{em}$ (wherein $P$ designates the gas pressure within the buret 1) is the corrective term of pressure for supplying the volume which would be occupied by the gas contained in the buret 1 and in the dead space of the sample-holder 6 if said gas were restored to normal pressure.

The operation of the apparatus according to the invention is as follows:

1. Computation of the relative pressure X by the analog computer 9:

The transducer 2 supplies the absolute pressure P at each instant. Said transducer extends over the pressure range $O-P_o$ (wherein $P_o$ is the saturated vapor pressure).

The transducer must have a small internal chamber and its main property must be that of linearity; $h$ (that is to say $1/P_o$) is represented by a potentiometric voltage divider which provides a means whereby the unit relative pressure is caused to correspond to a convenient division of the graph paper of the plotter 12.

2. Computation of the analog computer 9 of the volume Y of gas or of vapor which is adsorbed on the sample:

The equipment is so designed that the volume $V_b$ and the volume $V_{em}$ are adjusted separately.

In the computer 9, all the volumes are represented by voltages.

Adjustment of voltages as a function of volumes of gas is carried out as follows:

a. Volume $V_b$ of gas or of vapor within the buret 1:

Since the buret 1 is calibrated, it is only necessary to follow the level of the free surface of the mercury to determine the volume of gas.

Figure 3:
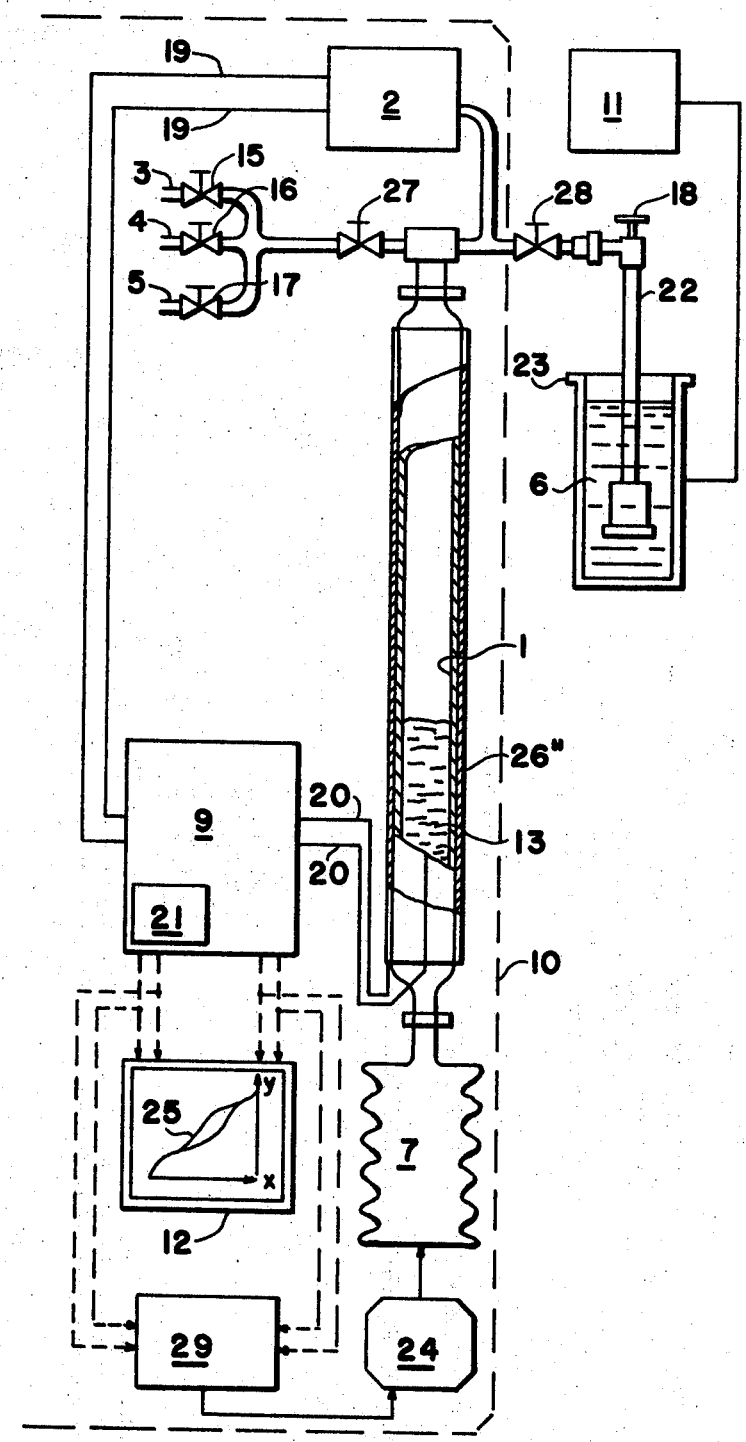
FIGS. 3 and 4 are similar to FIG. 2 but show other means for determining mercury level in the buret.
Figure 4:
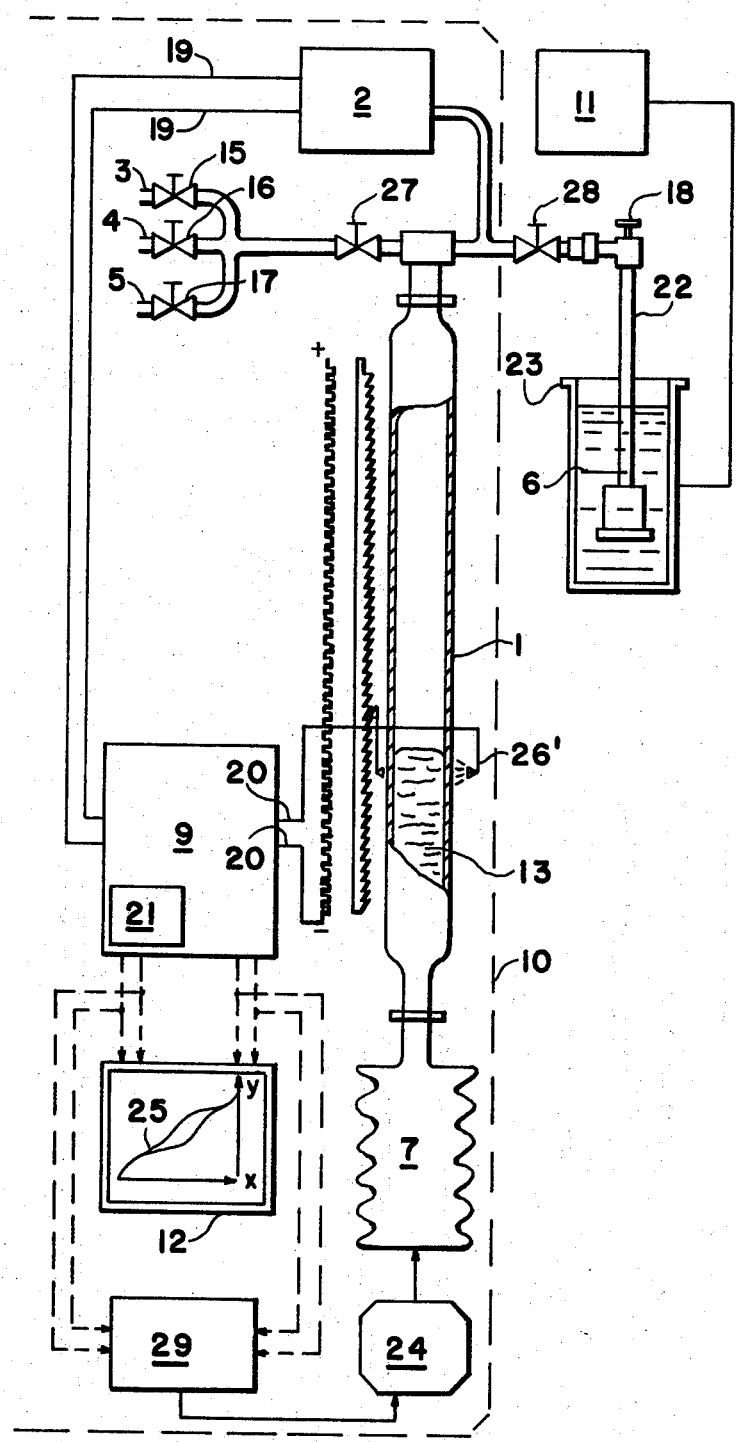

Said level can be determined in three ways: by means of a homogeneous platinum wire 26 (FIG. 1) through which an electric current is passed, by means of a spot follower 26' (FIG. 4) or by means of a capacitance bridge, whilst an external electrode (26" FIG. 3) and the column of mercury perform the function of capacitor.

These three methods all result in the same adjustment of the volume $V_b$ but the first method, which is the least costly, is carried into effect in the example given in the figure.

Adjustment of the volume $V_b$ is carried out as follows: although the buret 1 is calibrated, a portion of said buret (leading to the transducer 2, to the sample-holder 6 and so forth) is no longer linear above a certain level but can be assimilated with a given fictitious height of calibrated buret. Moreover, the origin of the voltage or of the capacitance (in the case of the capacitance bridge) is taken at a given height of the buret 1 which does not necessarily correspond to the fictitious upper extremity of said buret.

These two phenomena make it necessary to employ a compensation voltage $v$ (such that $V_b = V_{calibrated\ buret} + v$) which can be either positive or negative.

The analog computer 9 serves to adjust the voltage $v$.

According to Mariotte's law, since the temperature is constant, we have:

$$PV_b = \text{constant}.$$

We must therefore have:

$$Y = [V_q - (V_{calibrated\ buret} + v) \cdot P/760] \cdot k$$

the buret being isolated from the dead space $V_{em}$ by closure of the cock 28 and $V_q$ being of any value (the voltage $V_{em}$ being disconnected).

If $v$ is badly adjusted to an extent corresponding to the quantity $v_1$, there is obtained as a function of $P$ a straight line having a slope $-v_1$, the ordinate of which at the origin is:

$$[V_q - (V_{bc} + v_{exact}) P/760] \cdot k.$$

It is only necessary to vary the voltage $v$ in order that, at the pressure $P$, the value $Y$ should be equal to the ordinate at the origin.

b. Initial volume $V_i$ of gas or of vapor: this is the volume which is initially introduced into the buret 1 (the cock 28 being closed), that is to say in accordance with Mariotte's law, $$V_i = V_b \cdot P/760$$

and therefore Y is reduced to $$Y = [V_i - V_b \cdot P/760] \cdot k$$

and is equal to zero since the cock 28 is closed and the volume introduced is present within the buret.

In consequence, it is only necessary to adjust the voltage $V_i$ in order to obtain $Y = 0$.

c. Volume $V_{em}$ of the dead space of the sample-holder 6: the dead-space volume is adjusted by means of a gas which is either not adsorbed or practically not adsorbed; this gas is introduced into the buret and passed into the sample-holder.

Since the quantity of adsorbed gas is zero (or practically zero) we therefore have:

$$Y = V_{ads.} = [V_i - (V_b + V_{em}) \cdot P/760] \cdot k = 0,$$

with $k$ different from zero.

It is merely necessary to regulate the voltage $V_{em}$ in such a manner as to obtain $V_{ads} = 0$ (it is recalled that the volumes are assimilated with voltages).

d. Factor $k$ relating the voltage to the unit volume.

The sample-holder is replaced by a known volume $V_c$ and $k$ is adjusted by expansion of the gas contained within the buret 1 in a known volume $V_c$ while taking into account the pressure and the temperature of the gas at the moment of the experiment.

We therefore have:

$$V = V_c = [V_i - V_b \cdot P/760] k$$

$V_b$ being the volume of the gas within the buret 1 after expansion.

The analog computer 9 is simple, accurate and inexpensive. Voltages corresponding to $V_b$ and to the pressure P are fed into the computer and the values X and Y are delivered at the output.

The voltages corresponding to $V_i$, $V_{em}$, $v$, $h = 1/P_o$ and $k$ are adjusted in the computer.

When $v$ has been adjusted, it is already possible to check the good operation of the assembly, that is to say of the transducer 2, the computer 9 and the level detector 11 by proving compliance with Mariotte's law.

Figure 2:
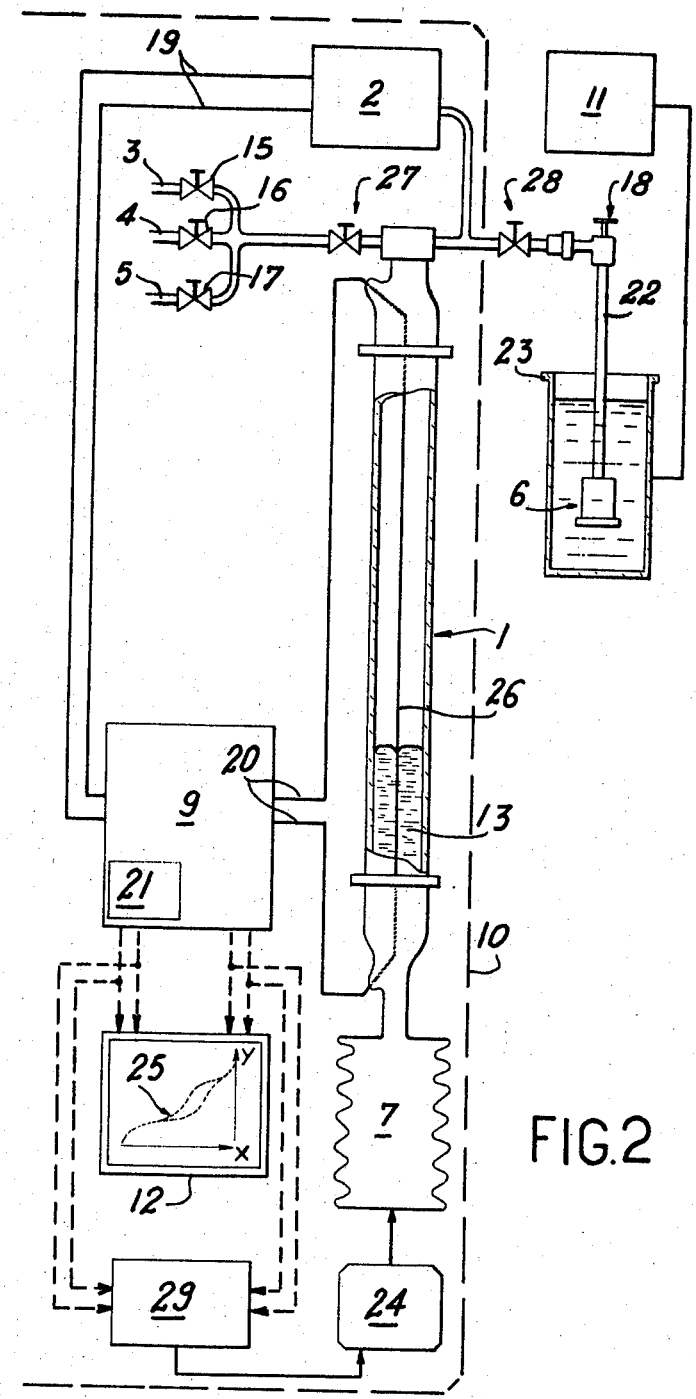

When $V_i$, $V_{em}$, $h = 1/P_o$ and $k$ have been adjusted, a displacement can be carried out by means of the vessel 7 at an extremely low speed, thereby causing a pressure variation within the buret 1 at a low rate such that the physicochemical and thermal equilibrium of adsorption of gas or of vapor on the sample contained in the sample-holder 6 is practically achieved at each instant. In order to obtain a pressure variation within the buret 1 at a rate which is sufficiently slow to ensure perfect physico-chemical and thermal equilibrium, provision can be made for a programming unit 29 interposed between the analog computer 9 and a drive unit 24 which is controlled by said programming unit and serves to modify the volume of said buret 1 (as shown in FIG. 2).

The advantage of the embodiment just mentioned lies in the fact that the relative pressure varies more rapidly when the quantities which are either adsorbed or desorbed are small and that it is possible to await the attainment of physico-chemical and thermal equilibria when the quantities which are adsorbed or desorbed are substantial.

There is chosen a function which is preferably simple such as $X + mY$, for example, which relates the pressure to the volumes of adsorbed or desorbed gases and in which $m$ is a constant which is dependent on the sample ; $X + mY$ must vary in such a manner as to satisfy at each instant the relation :

$X(t) + mY(t) = nt + X(t_0) + mY(t_0)$ in the case of adsorption (wherein $t_0$ is the time corresponding to the beginning of manipulation and $n$ is an adjustable parameter representing the adsorption rate) and to the relation :

$X(t) + mY(t) = -n't + X(t_m) + mY(t_m)$ in the case of desorption (wherein $t_m$ designates the maximum adsorption time and $n'$ is an adjustable parameter representing the desorption rate) ; the parameters $n$ and $n'$ can be modified during the course of the test if necessary and $n'$ is preferably chosen so as to be smaller than $n$ inasmuch as desorption is often more difficult than adsorption and the variation must consequently take place at a lower rate.

In order to satisfy the two relations indicated in the foregoing, it is possible, for example, to make use of a programmer which comprises a capacitor. This capacitor is charged as a function of time during adsorption at a rate of $n$ volts per hour and is discharged during desorption at a rate of $n'$ volts per hour. When either of the two foregoing relations is not satisfied, the motor 24 starts up and rotates at a speed which is higher as the departure from one of these relations is greater.

By virtue of the alternative embodiment of FIG. 2, there is thus obtained a reduction in time compared with the case of FIG. 1 as well as improved results.

Thus, without programming (case of FIG. 1), a period of 48 hours is necessary to carry out a measurement on a compressed alumina ball having a diameter of 1 mm and a mean pore radius of 100 A ; with programming (case of FIG. 2), this time is reduced by one-half.

The column of mercury 13 ensures perfect leaktightness. In the case in which the level of the free surface of said column is detected by means of a platinum wire such as the wire 26 which is shown in the figure, the current intensity, the cross-sectional area of said wire and the cross-sectional area of the column of mercury are chosen so as to result on the one hand in negligible heating of the gas or of the vapor while taking into account their thermal conductivity and so as to give rise on the other hand to a very small error in the volumes.

In the example of FIG. 2, the reference numeral 29 generally designates a programming unit and the reference numeral 24 designates any drive unit which is controlled by said programming unit and serves to modify the volume of the enclosure 1.

The advantage of the embodiment shown in FIG. 2 lies in the fact that, when the quantities which are adsorbed or desorbed are small, the relative pressure varies at a higher rate and that, when large amounts are either adsorbed or desorbed, it is possible to wait until physicochemical and thermal equilibria are reached. When either of the two relations set forth in the foregoing is not satisfied, the drive unit 24 starts up and rotates at a speed which increases as the departure from one of these relations becomes greater.

What we claim is:

1. An apparatus for plotting adsorption-desorption isotherms, wherein said apparatus essentially comprise a variable-volume enclosure, a pressure transducer in communication with said enclosure, at least three pipes including a vacuum line, at least one pipe for the admission of adsorbable gases or vapors and one pipe for the admission of non-adsorbable gases, a sample-holder containing the sample to which the measurements relate, said pipes and said sample-holder being also in communication with said enclosure but fitted with valves which serve to isolate them from said enclosure, an analog computer which is connected electrically to said transducer and to said enclosure and a cartesian coordinate plotter connected to said computer, constancy of temperature being ensured in the case of the enclosure, the transducer, the analog computer and the sample-holder.

2. A plotting apparatus in accordance with claim 1, wherein the variable-volume enclosure is constituted by a calibrated buret which contains a column of mercury and communicates with a reserve supply of mercury.

3. A plotting apparatus in accordance with claim 2, wherein the level of the free surface of the mercury contained in the calibrated buret is determined by means of a homogenous platinum wire through which an electric current is passed.

4. An apparatus in accordance with claim 2, wherein the level of the free surface of mercury is determined by means of a spot follower.

5. An apparatus in accordance with claim 2, wherein the level of the free surface of the mercury is determined by means of a capacitance bridge whilst an external electrode and the column of mercury perform the function of capacitor.

6. A plotting apparatus in accordance with claim 1, wherein a programming unit is interposed between the analog computer and a drive unit which is controlled by said programming unit and modifies the volume of said enclosure.

7. A plotting apparatus in accordance with claim 6, wherein said programming unit comprises a capacitor.

* * * * *